United States Patent
Kinder (10) Patent No.: US 10,262,174 B1
(45) Date of Patent: Apr. 16, 2019

(54) TESTING CONTROLLABLE CARDS

(71) Applicant: Red Hat, Inc., Raleigh, NC (US)

(72) Inventor: Nathan Kinder, Cottonwood, CA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/730,866

(22) Filed: Oct. 12, 2017

(51) Int. Cl.
*G06K 7/00* (2006.01)
*G06K 7/10* (2006.01)
*G06F 13/10* (2006.01)

(52) U.S. Cl.
CPC ....... *G06K 7/10465* (2013.01); *G06F 13/102* (2013.01); *G06K 7/0073* (2013.01); *G06F 2213/3804* (2013.01)

(58) Field of Classification Search
CPC .............. G06K 7/10465; G06K 7/0073; G06F 13/102; G06F 2213/3804
See application file for complete search history.

(56) References Cited

U.S. PATENT DOCUMENTS

| | | | |
|---|---|---|---|
| 6,438,638 B1 | 8/2002 | Jones et al. | |
| 6,516,357 B1 * | 2/2003 | Hamann | G06Q 20/3552 709/229 |
| 7,032,052 B2 * | 4/2006 | Sauber | G06F 13/385 710/301 |
| 7,369,982 B2 | 5/2008 | Leaming | |
| 8,484,671 B1 | 7/2013 | Kahn et al. | |
| 8,645,767 B2 * | 2/2014 | Craddock | G06F 11/0745 714/43 |
| 8,775,709 B2 | 7/2014 | Lu et al. | |
| 9,836,424 B2 * | 12/2017 | Ajanovic | A47K 7/028 |
| 2002/0055822 A1 * | 5/2002 | Amadeo | G06K 7/0095 702/38 |
| 2006/0026350 A1 | 2/2006 | Lee et al. | |

OTHER PUBLICATIONS

TDA8026—Multiple Smart Card Slot Interface IC, Jun. 30, 2016, https://www.nxp.com/docs/en/data-sheet/TDA8026.pdf.
Maxim Integrated 73S1210F Self-Contained Smart Card Reader, http://www.mouser.in/new/maxim-integrated/maxim73s1210f/.

* cited by examiner

*Primary Examiner* — Seung H Lee
(74) *Attorney, Agent, or Firm* — Kilpatrick Townsend & Stockton LLP (57) ABSTRACT

Controllable cards can be selected and testing programmatically. For example, a system can include card ports for receiving controllable cards. Switching devices can control communication with the controllable cards. An output port can communicatively couple a selected card to a card reader. A controller device can respond to a command from a test system by causing the switching devices to select a card port to which to communicatively couple to the output port.

20 Claims, 6 Drawing Sheets

TESTING CONTROLLABLE CARDS

TECHNICAL FIELD

The present disclosure relates generally to testing and configuring controllable cards, which can include smart cards.

BACKGROUND

A controllable card, such as a smart card, can be programmed or otherwise controlled to perform certain functions when read by a card reader. For example, a card reader may be coupled to a computing device that can allow a user to operate the computing device only in response to a controllable card with the appropriate information on it being received in the card reader. Removing the card, or inserting a card without the proper information, can result in a user being prevented from operating the computing device. For example, the screen of the computing device can lock or change to a black screen in response to the card being removed. Controllable cards can be programmed using software developed to apply security or other functions to the card.

DETAILED DESCRIPTION

Controllable cards can be programmed to be valid, invalid, provide certain identifying information, etc. Software developed to apply to controllable cards can be tested for quality assurance purposes. Testing the software can involve testing each applicable controllable card, or at least a relatively large number of controllable cards. Each card can be inserted into a reader, or removed from the reader, to test the software implemented on the card. Inserting or removing each card that is tested is time consuming and expensive as it involves manual operations. Testing can involve months of effort to physically insert and remove each card for quality assurance. Robotic arms used to automatically insert and remove cards from a reader can be expensive and large—taking up space in a test environment.

Some examples of the present disclosure can overcome one or more of the abovementioned issues by programmatically selecting a controllable card from among multiple controllable cards available, without requiring each card to be physically inserted or removed each time the card is tested.

As a particular example, a device can include card ports that can receive multiple controllable cards simultaneously to be tested. The device can include a port for communicating with a test system and an output port for communicatively coupling a controllable card to a card reader of a target system. A controller device can receive commands from the test system and control switching devices to select a controllable card to couple to the output port and to prevent other controllable cards from coupling to the output port. The controller device can also control switching devices to decouple the selected controllable card from the output port. The switching devices can be multiplexers that can allow a certain card to be selected, and in some examples some or all contacts of that card. Selecting the controllable card can simulate inserting the card into the card reader of the target system and decoupling the controllable card can simulate removing the card from the card reader of the target system. Multiple cards can be individually tested using the device without requiring each card to be individually physically inserted and removed from a card reader.

The card reader can be a standard, unmodified card reader in some examples. The card reader can be coupled to a card adapter that can convey data between the controllable cards and the card reader. For example, the card adapter can have a form that is similar to a controllable card and be received in the card reader. The card adapter can also include a communication port that can communicatively couple to the output port of the device to receive and transmit data with the controllable cards.

Examples of a controllable card include a smart card, an electronic token, a programmable card, or another device that is portable with the capability to include data that is readable.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
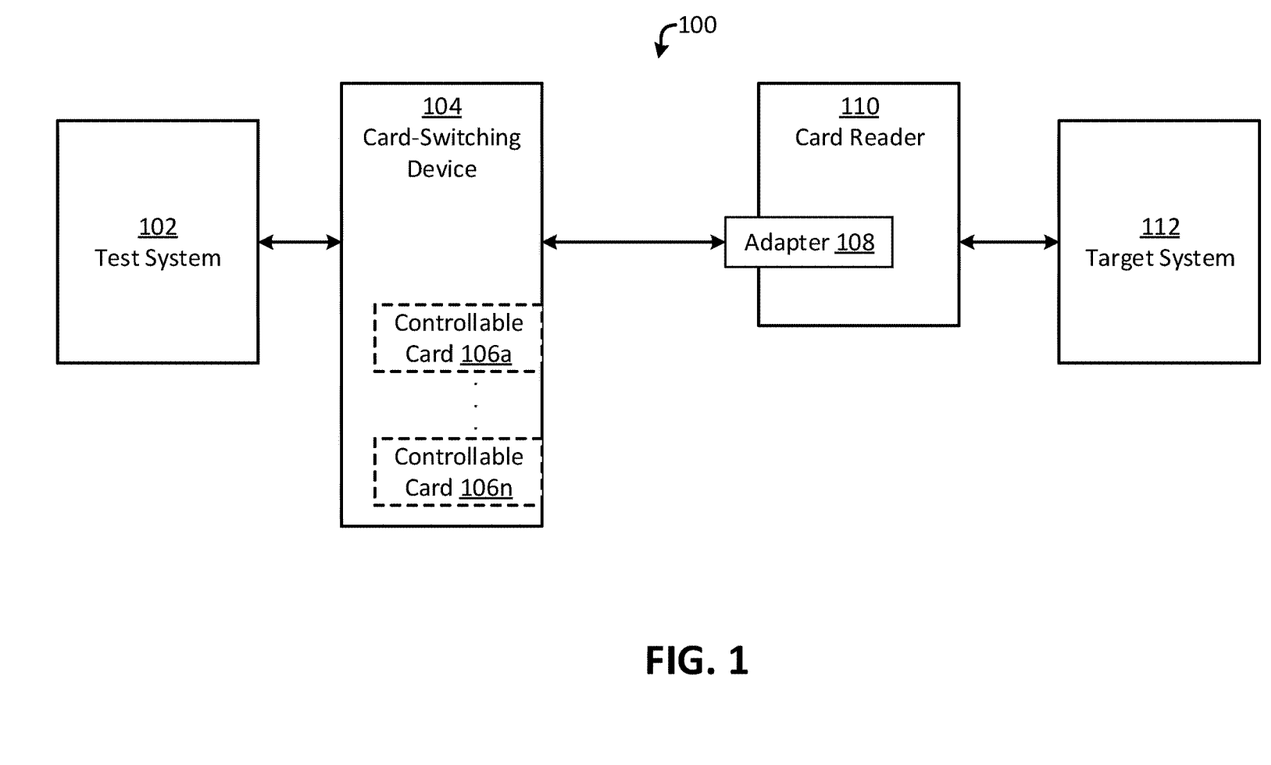
FIG. 1 is a block diagram of an example of a system for testing and applying controllable cards according to some aspects.

FIG. 1 is a block diagram of an example of a system 100 for testing and applying controllable cards 106a-n according to some aspects. The system 100 includes a test system 102 communicatively coupled to a card-switching device 104 that includes multiple controllable cards 106a-n received in card slots. The card-switching device 104 is communicatively coupled to a card reader 110 and a target system 112 through an adapter 108.

The card-switching device 104 can receive commands from the test system 102. The card-switching device 104 can receive the commands from the test system 102 via, for example, a RS-232 serial interface. An example of a command is to select controllable card 106a to communicatively couple to the target system 112 through the adapter 108 and the card reader 110. In response, the card-switching device 104 can control circuitry to cause the card port associated with the controllable card 106a to communicatively couple to the adapter 108 and to prevent other controllable cards among controllable cards 106a-n from communicatively coupling to the adapter 108. If another controllable card is communicatively coupled to the adapter 108, the card-switching device 104 can control circuitry to disconnect, or deselect, that controllable card from communicatively coupling to the adapter 108 prior to causing controllable card 106a to communicatively couple to the adapter 108.

In some examples, the test system 102 may be used to program or otherwise configure one or more of the controllable cards 106a-n via the card-switching device 104, in addition to causing the card-switching device 104 to select from among the controllable cards 106a-n.

Figure 2:
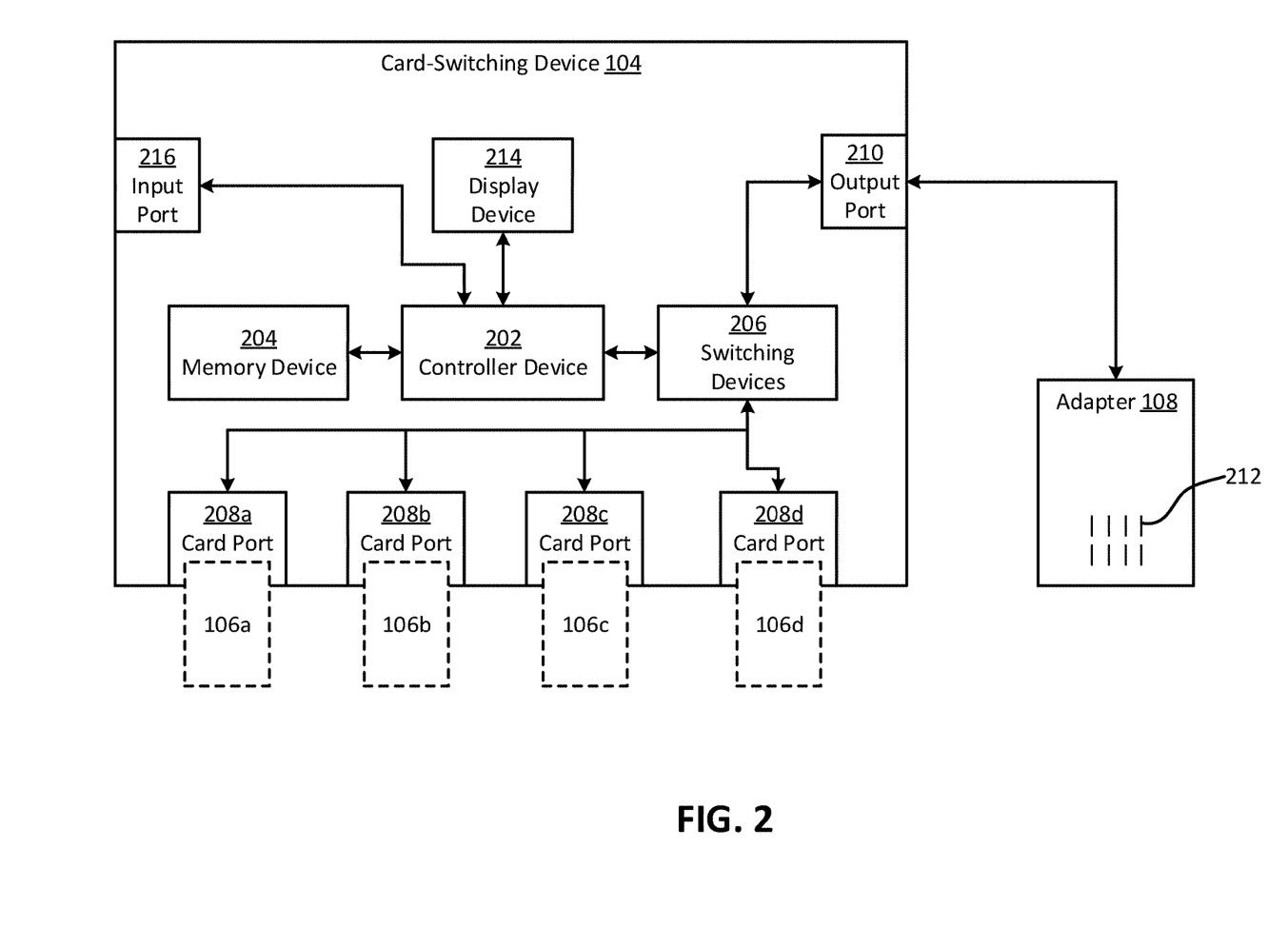
FIG. 2 is a block diagram of an example of a card-switching device and an adapter according to some aspects.

FIG. 2 is a block diagram of an example of the card-switching device 104 and the adapter 108 according to one example. The card-switching device 104 includes a controller device 202 communicatively coupled to a memory device 204 and switching devices 206. An example of the controller device 202 can be an Atmel™ ATmega32U4 microcontroller. The controller device 202 is also communicatively coupled to a display device 214 and an input port 216. The switching devices 206 are coupled to card ports 208a-d that can receive controllable cards 106a-d. An output port 210 is coupled to the switching devices 206 and an adapter 108 for a card reader. (Although labeled as output port 210, communications from the adapter 108 to the card-switching device 104 are also possible.) The adapter 108 includes contacts 212 to exchange data with the card reader by interfacing with the card reader. In some examples, the contacts 212 can be in locations described in International Organization for Standardization (ISO) 7816. The adapter 108 may also include a port, such as a RJ45 jack, for communicatively coupling to the card-switching device 104.

Commands from a test system can be received via the input port 216 by the controller device 202. An example of the input port 216 is universal service bus (USB) implementing a serial interface. (Although labeled as input port 216, communications from the card-switching device 104 to the test system via the input port 216 are also possible.) In response to the commands, the controller device 202 can execute code stored in the memory device 204 to cause the controller device 202 to control the switching devices 206. Examples of the controller device 202 include a processor device and a microcontroller. The memory device 204 may be or include a non-transitory computer-readable medium for storing executable code. In some examples, the controller device 202 and the memory device 204 are in the same housing. For example, the controller device 202 and the memory device 204 may be in the same integrated circuit.

The switching devices 206 may be multiplexer integrated-circuits, such as Maxim™ MAX4638 multiplexers, that are controlled by the controller device 202 to select a card port among card ports 208a-d (and a controllable card associated with the selected card port) to communicatively couple to the output port 210. The switching devices 206 can switch which card port is coupled to the output port 210 based on the command and can prevent the other card ports from communicatively coupling to the output port 210. The controller device 202 can output data to the display device 214 that identifies which card slot, if any, is selected to communicatively couple to the adapter 108. An example of the display device 215 can be a seven-segment display, such as a Kingbright™ SA56-51PBWA/A display.

In response to a card port being selected for which no controllable card is received, an indication can be communicated back to the controller device 202, which can provide a responsive message to the test system via the input port 216 that no controllable card is present in the selected card port. In some examples, the card-switching device 104 can incorporate card-presence circuitry to detect whether a controllable card is present in a card port.

In some examples, the card-switching device 104 can respond to a command from the test system with status information about the card-switching device 104. For example, controller device 202 can receive a request from the test system for a status of the card-switching device 104. In response, the controller device 202 can communicate status information to the test system. Examples of the status information can include which controllable card 106a-d is currently selected, which card ports 208a-d have controllable cards in them, which card ports 208a-d do not have controllable cards in them, whether the card-switching device 104 is powered on, or any combination of these.

Figure 3:
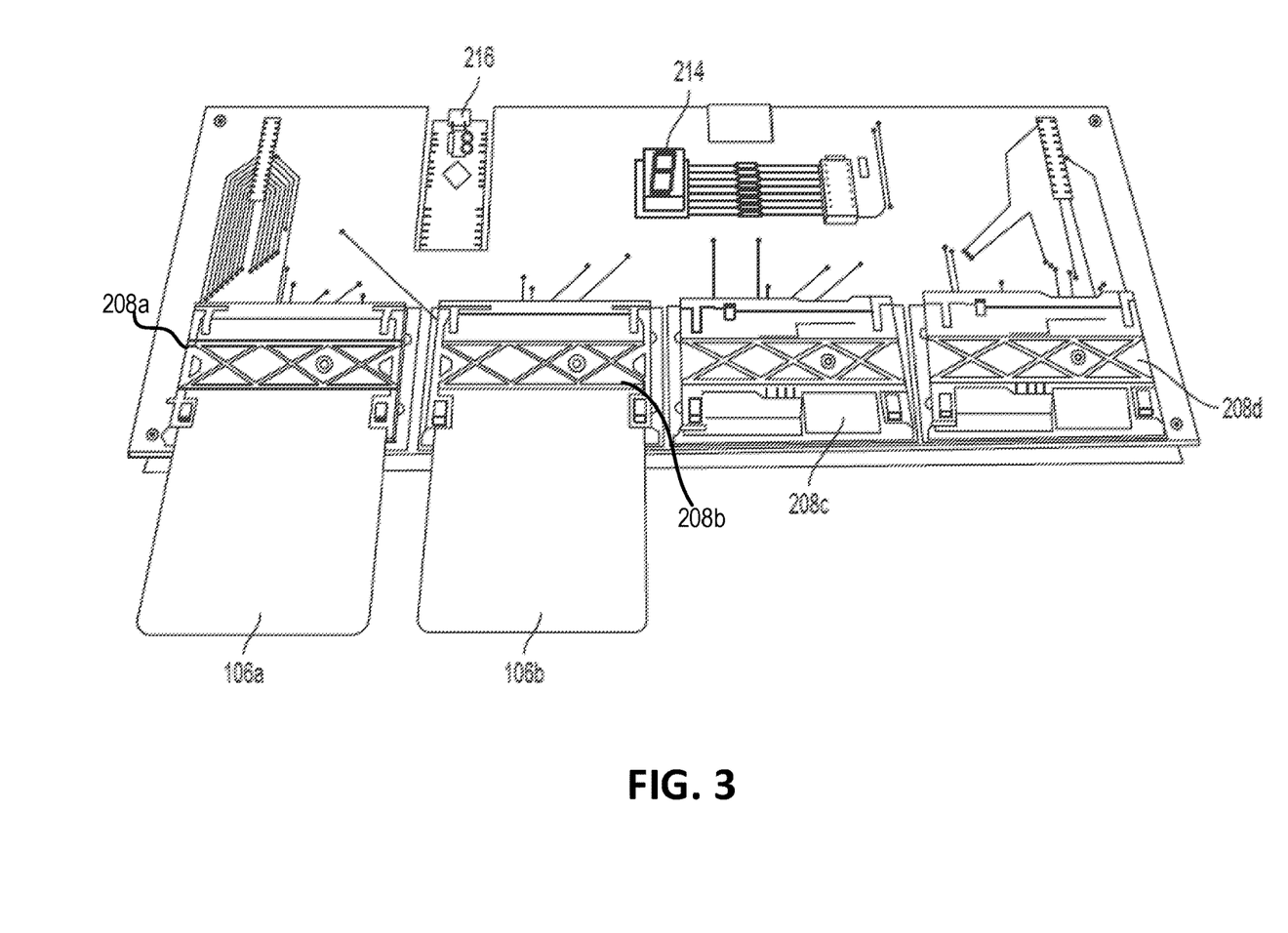
FIG. 3 is a top view of an example of part of a card-switching device according to some aspects.

FIG. 3 is a top view of an example of part of a card-switching device according to one example. Shown is an input port 216, a display device 214 that is an LED display, four card ports 208a-d and two controllable cards 106a-b positioned in card ports 208a-b, respectively. Examples of the card ports 208a-d can include Amphenol™ C702 10M008 230 40 card ports. But in other examples, the card-switching device can include any number of card ports having any number of controllable cards. The controllable cards can easily be inserted into, or removed from, the card ports 208a-d to configure the card-switching device for operation. For example, the controllable cards 106a-b can be manually slid into corresponding slots of the card ports 208a-b.

Figure 4:
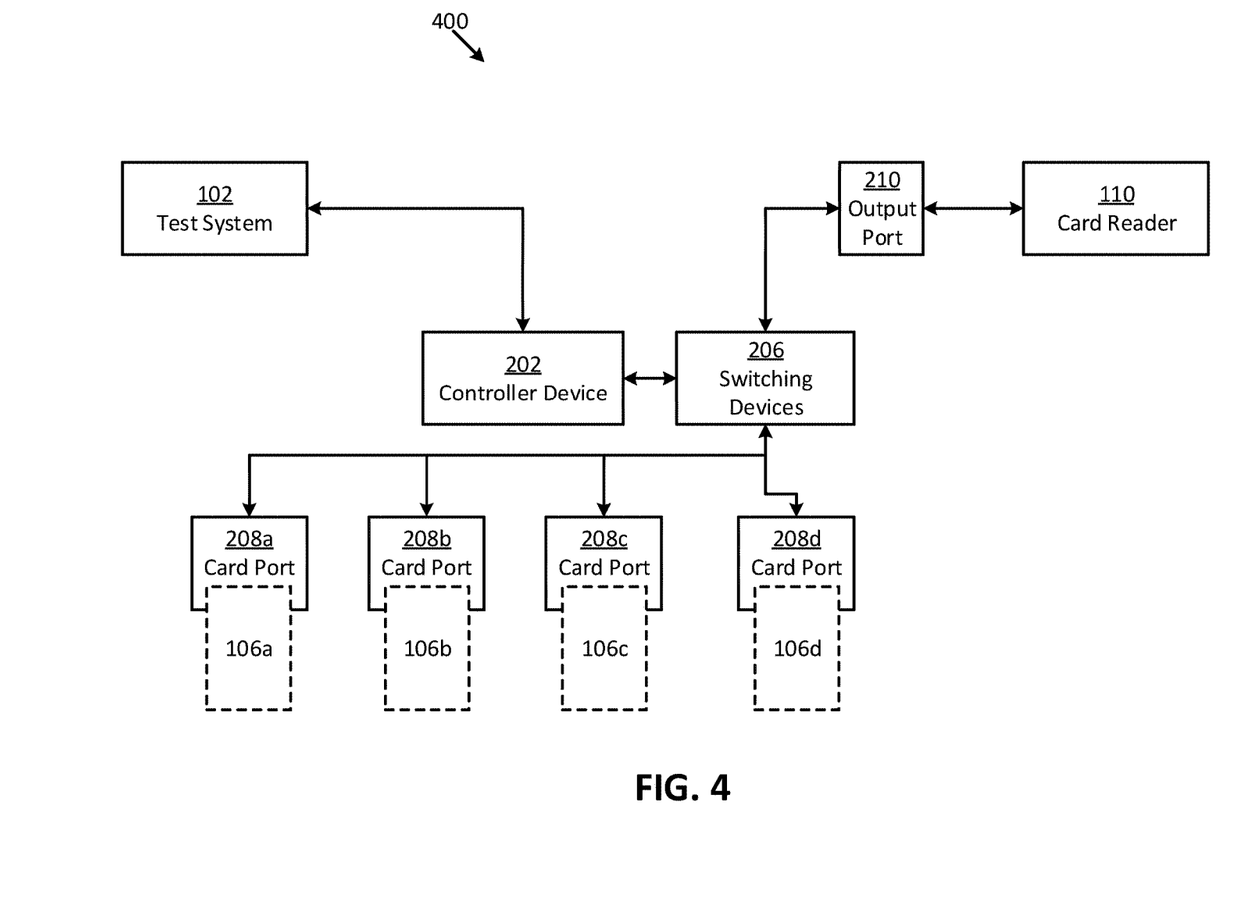
FIG. 4 is a block diagram of an example of a system for switching among card ports according to some aspects.

FIG. 4 is a block diagram of an example of a system 400 for switching among card ports 208a-d according to one example. The system includes the card ports 208a-d for receiving controllable cards 106a-d. An output port 210 can communicatively couple to a card reader 110. A controller device 202 can respond to a command from a test system 102 by causing switching devices 206 to select a card port among the card ports 208a-d to which to communicatively couple to the output port 210. Although certain components are shown in FIG. 4, other examples of the system 400 can include more components, fewer components, or different components than shown in FIG. 4.

The card ports 208a-d can receive the controllable cards 106a-d simultaneously. A controllable card among the controllable cards 106a-d is selectable by the controller device 202 to cause the switching devices 206 to communicatively couple the controllable card to the output port 210 and to prevent other controllable cards of the controllable cards 106a-d from communicatively coupling to the output port.

Each of the card ports 208a-d can include contacts for communicatively coupling to a controllable card. The switching devices 206 may be multiplexers and each contact can be associated with a different multiplexer than other contacts. Each of the card ports 208a-d can also be deselected by the controller device 202 controlling the switching devices 206, to simulate removable of a controllable card from a respective card port. The card ports 208a-d can be programmatically selected by the controller device 202 while the controllable cards 106a-d are in the card ports 208a-d.

Figure 5:
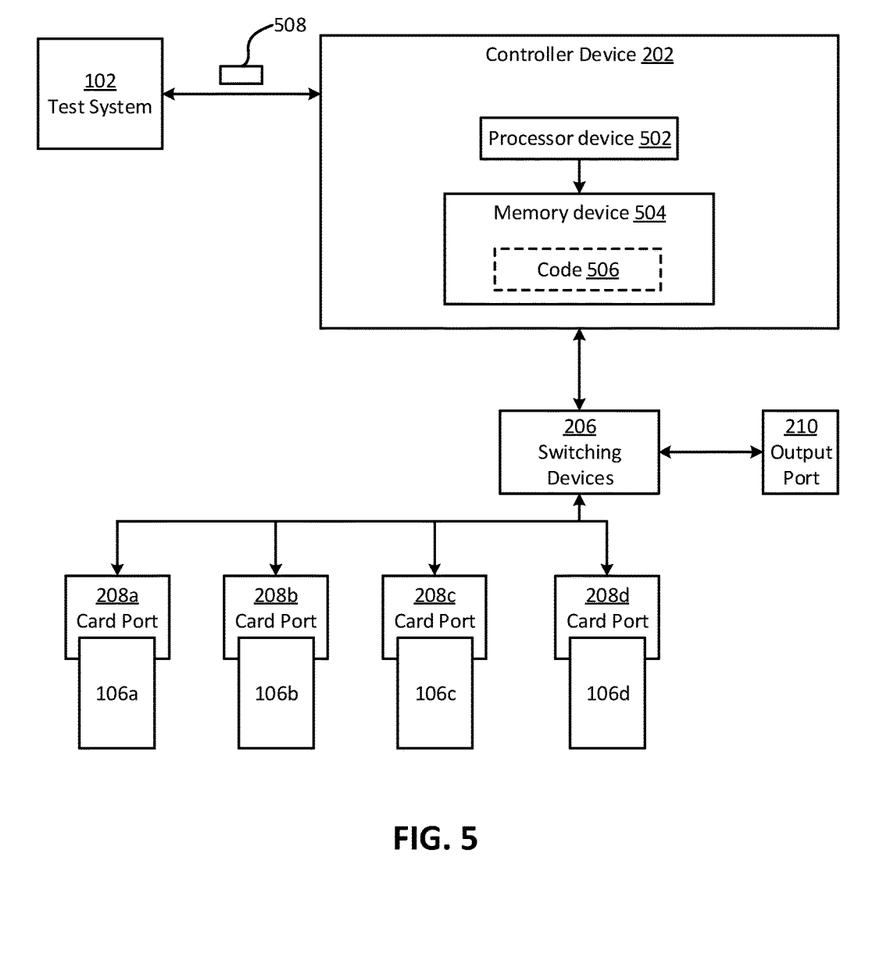
FIG. 5 is a block diagram of an example of a controller device and a test system according to some aspects.

FIG. 5 is a block diagram an example of a controller device 202 and a test system 102 according to one example. The controller device 202 includes a processor device 502 and a memory device 504 that includes code 506. The code 506 is executable by the processor device 502 for causing the controller device 202 to respond to a command 508 from the test system 102 by causing switching devices 206 to select a card port among the card ports 208a-d with controllable cards 106a-d received therein, to which to communicatively couple to an output port 210 for communicatively coupling a controllable card associated with the selected card port to a target system.

Non-limiting examples of the processor device 502 include a Field-Programmable Gate Array (FPGA), an application-specific integrated circuit (ASIC), a microprocessor, a microcontroller, etc. The processor device 502 can execute code 506 for selecting or controlling controllable cards 106a-d. In some examples, the code 506 can include processor-specific instructions generated by a compiler or an interpreter from code written in any suitable computer-programming language, such as C, C++, C#, etc. The code 506 may be firmware stored in a microcontroller, in some examples.

Memory device 504 can include one memory device or multiple memory devices. Non-limiting examples of the memory device 504 include electrically erasable and programmable read-only memory (EEPROM), flash memory, or any other type of non-volatile memory. In some examples, at least part of the memory device 504 can include a medium from which the processor device 502 can read instructions as code 506. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

Figure 6:
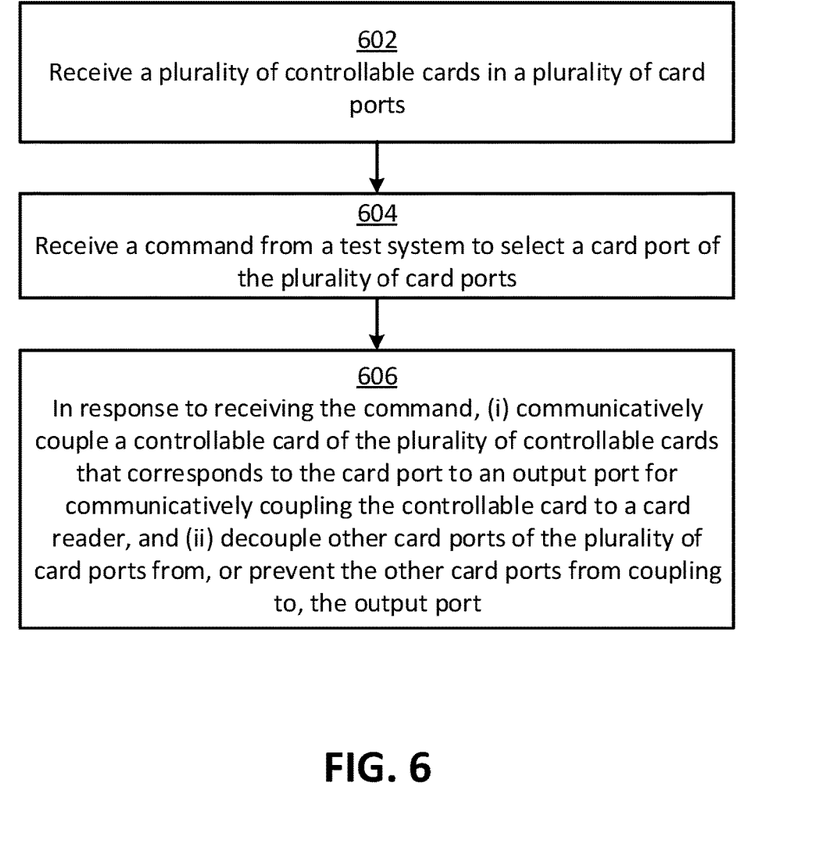
FIG. 6 is a flow diagram of an example of processing for selecting among controllable cards for communicatively coupling to a target system according to some aspects.

In some examples, the system of FIG. 5 can implement the steps shown in FIG. 6 to select or control selectable cards according to some examples. In other examples, the system can implement more steps, fewer steps, or a different order of the steps shown in FIG. 6. The steps of FIG. 6 are described below with reference to the components of FIG. 5 above.

In block 602, the card ports 208a-d receive controllable cards 106a-d. For example, the controllable cards 106a-d can be slid into slots of the card ports 208a-d or otherwise positioned with the card ports 208a-d. The controllable cards 106a-d can be received within the card ports 208a-d such that contacts on the controllable cards communicatively couple with contacts in the card ports 208a-d In block 604, the controller device 202 receives a command 508 from a test system 102 to select a card port among the card ports 208a-d. For example, the controller device 202 can receive the command via a wired interface or wireless interface. Examples of a wired interface can be a cable, such as an Ethernet cable or a USB cable. Examples of the wireless interface can be an 802.11g or Bluetooth interface. The controller device 202 can receive the command directly from the test system 102 or via a network, such as a wide area network (WAN) or a local area network (LAN). For example, the command 508 can be formed from one or more packets of data communicated from the test system 102 to the controller device 202 via the Internet.

In block 606, the controller device 202, in response to receiving the command 508, communicatively couples a controllable card that corresponds to the selected card port to the output port 210 for communicatively coupling the controllable card to a card reader. Also in response to receiving the command 508, the controller device 202 decouples other card ports of the card ports 208a-d from, or prevent the other card ports from coupling to, the output port 210.

For example, the controller device 202 can transmit commands to, or otherwise operate, the switching devices 206 to cause the controllable card that corresponds to the selected card port to communicatively couple with the output port 210. This may involve operating several switching devices 206 simultaneously in order to communicatively couple contacts of the selected card port to contacts in the output port 210. In one particular example, each contact in the selected card port is coupled to a different multiplexer. The controller device 202 can operate some or all of the multiplexers simultaneously in order to couple some or all of the contacts in the selected card port to contacts in the output port 210, thereby communicatively coupling the controllable card that corresponds to the selected card port to the output port 210.

Additionally or alternatively, the controller device 202 can transmit commands to, or otherwise operate, the switching devices 206 to cause the other card ports of the card ports 208a-d to decouple from the output port 210 (or to prevent the other card ports 208a-d from communicatively coupling to the output port 210). This may involve operating several switching devices 206 simultaneously in order to decouple contacts of the other card ports from contacts in the output port 210. In one particular example, each contact in the other card ports is coupled to a different multiplexer. The controller device 202 can operate some or all of the multiplexers simultaneously in order to decouple some or all of the contacts in the other card ports to contacts in the output port 210, thereby decoupling the other card ports from the output port 210.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s).

The invention claimed is:

1. A system comprising:
a plurality of card ports for receiving a plurality of controllable cards;
switching devices for controlling communication with the plurality of controllable cards;
an output port for communicatively coupling to a card reader; and
a controller device for responding to a command from a test system by causing the switching devices to:
communicatively couple a card port to the output port; and
decouple another card port of the plurality of card ports from, or prevent the other card port from coupling to, the output port.

2. The system of claim 1, wherein the plurality of card ports receive the plurality of controllable cards simultaneously,
wherein a controllable card of the plurality of controllable cards is selectable by the controller device to cause the switching devices to communicatively couple the controllable card to the output port and to prevent other controllable cards of the plurality of controllable cards from communicatively coupling to the output port.

3. The system of claim 1, wherein each card port includes a plurality of contacts for communicatively coupling to a controllable card of the plurality of controllable cards, wherein the switching devices are multiplexers, each contact of the plurality of contacts being associated with a different multiplexer than other contacts of the plurality of contacts.

4. The system of claim 1, wherein each card port of the plurality of card ports is deselectable by the controller device to simulate removal of a controllable card from the card port.

5. The system of claim 1, wherein the card port is communicatively connectable to a controllable card reader through the output port and a card reader adapter communicatively coupled to the controllable card reader.

6. The system of claim 5, wherein the card reader adapter is configured to be inserted into a receiving slot of the controllable card reader.

7. The system of claim 1, wherein the command identifies the card port to which to communicatively couple to the output port.

8. The system of claim 1, wherein the plurality of card ports are programmatically selectable by the controller device while the plurality of controllable cards are in the plurality of card ports.

9. A method comprising:
receiving a plurality of controllable cards in a plurality of card ports; and
receiving a command from a test system to select a card port of the plurality of card ports;
in response to receiving the command,
(i) communicatively coupling a controllable card of the plurality of controllable cards that corresponds to the card port to an output port for communicatively coupling the controllable card to a card reader; and
(ii) decoupling other card ports of the plurality of card ports from, or preventing the other card ports from coupling to, the output port.

10. The method of claim 9, further comprising:
programmatically switching among card ports of the plurality of card ports while the plurality of controllable cards are in the plurality of card ports.

11. The method of claim 9, wherein the plurality of controllable cards are present in the plurality of card ports simultaneously with the controllable card being selected for communicatively coupling to the card reader.

12. The method of claim 9, wherein each card port includes a plurality of contacts for communicatively coupling to the controllable card of the plurality of controllable cards, wherein each contact of the plurality of contacts is associated with a different multiplexer than other contacts of the plurality of contacts.

13. The method of claim 9, further comprising:
communicatively decoupling the card port from the output port to simulate removal of the controllable card from the card port.

14. The method of claim 9, further comprising:
communicatively coupling the controllable card to a target system through the card reader and a card reader adapter.

15. A controller device, comprising:
a processor device; and
a non-transitory computer-readable memory device with code that is executable by the processor device for causing the controller device to:
respond to a command from a test system by causing switching devices to: (i) communicatively couple a card port of a plurality of card ports to an output port for communicatively coupling a controllable card associated with the card port to a target system, and (ii) decouple another card port of the plurality of card ports from, or prevent the other card port from coupling to, the output port.

16. The controller device of claim 15, wherein the memory device further includes code that is executable by the processor device for causing the controller device to:
select, while the plurality of controllable cards are in the plurality of card ports, the controllable card of the plurality of controllable cards to communicatively couple to the output port, and prevent other controllable cards of the plurality of controllable cards from communicatively coupling to the output port.

17. The controller device of claim 15, wherein the memory device further includes code that is executable by the processor device for causing the controller device to:
control the switching devices to select, for each card port, one or more contacts of the controllable card associated with the card port, wherein each contact is associated with a different switching device than other contacts, wherein the switching devices are multiplexers.

18. The controller device of claim 15, wherein the memory device further includes code that is executable by the processor device for causing the controller device to:
deselect the card port of the plurality of card ports to simulate removal of the controllable card from the card port.

19. The controller device of claim 15, wherein the memory device further includes code that is executable by the processor device for causing the controller device to:
communicatively couple the card port to the target system through the output port, a card reader, and a card reader adapter.

20. The controller device of claim 15, wherein the memory device further includes code that is executable by the processor device for causing the controller device to:
programmatically select among the plurality of card ports while the plurality of controllable cards are in the plurality of card ports.

\* \* \* \* \*